(12) United States Patent
He et al.

(10) Patent No.: US 10,980,043 B2
(45) Date of Patent: Apr. 13, 2021

(54) DATA TRANSMISSION METHOD AND DEVICE, AND BASE STATION

(71) Applicant: ZTE CORPORATION, Guangdong (CN)

(72) Inventors: Qingchun He, Shenzhen (CN); He Huang, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/346,422

(22) PCT Filed: Nov. 2, 2017

(86) PCT No.: PCT/CN2017/109048
§ 371 (c)(1),
(2) Date: Apr. 30, 2019

(87) PCT Pub. No.: WO2018/082595
PCT Pub. Date: May 11, 2018

(65) Prior Publication Data
US 2019/0274151 A1    Sep. 5, 2019

(30) Foreign Application Priority Data
Nov. 2, 2016 (CN) .......................... 201610958158.9

(51) Int. Cl.
*H04W 72/12* (2009.01)
*H04L 12/865* (2013.01)
*H04W 80/02* (2009.01)
*H04W 88/08* (2009.01)

(52) U.S. Cl.
CPC ..... *H04W 72/1242* (2013.01); *H04L 47/6275* (2013.01); *H04W 72/12* (2013.01); *H04W 80/02* (2013.01); *H04W 88/085* (2013.01)

(58) Field of Classification Search
CPC ... H04W 80/02; H04W 88/085; H04W 72/12; H04W 72/1242; H04L 47/6222; H04L 47/6275; H04L 47/50
USPC .......................................................... 370/329
See application file for complete search history.

(56) References Cited

U.S. PATENT DOCUMENTS

| | | | |
|---|---|---|---|
| 2008/0159216 A1* | 7/2008 | Holma | H04W 72/1242 370/329 |
| 2011/0134830 A1* | 6/2011 | Lin | H04L 45/24 370/328 |
| 2018/0199228 A1* | 7/2018 | Van Phan | H04L 67/322 |

FOREIGN PATENT DOCUMENTS

| | | |
|---|---|---|
| CN | 102056319 A | 5/2011 |
| CN | 102291779 A | 12/2011 |
| CN | 103986666 A | 8/2014 |
| EP | 2 897 433 A1 | 7/2015 |

(Continued)

OTHER PUBLICATIONS

Catt, "Further consideration on retransmission prioritization," 3GPP TSG RAN WG2 Meeting #95, R2-164804, Gothenburg, Sweden, Aug. 22-26, 2016.

(Continued)

*Primary Examiner* — Rownak Islam
(74) *Attorney, Agent, or Firm* — Foley & Lardner LLP (57) ABSTRACT

A data transmission method includes: identifying a priority of a received user plane data packet, and transmitting and processing the received user plane data packet according to the identified priority. Also disclosed is a data transmission device and a base station.

12 Claims, 6 Drawing Sheets

Identify a priority of a received user plane data packet — 202

Transmit and process the received user plane data packet according to the identified priority — 204

(56) References Cited

FOREIGN PATENT DOCUMENTS

WO     WO-2017192164 A1 * 11/2017 ............ H04W 80/02
WO     WO-2018031069 A1 *  2/2018 ........ H04W 72/1215

OTHER PUBLICATIONS

International Search Report and Written Opinion for International Appl. No. PCT/CN2017/109048, dated Jan. 26, 2018.

* cited by examiner

DATA TRANSMISSION METHOD AND DEVICE, AND BASE STATION

CROSS-REFERENCE TO RELATED APPLICATIONS

This is a National Stage Application, under 35 U.S.C. 371, of International Patent Application No. PCT/CN2017/109048, filed on Nov. 2, 2017, which claims priority to Chinese Patent Application No. 201610958158.9 filed on Nov. 2, 2016, contents of both of which are incorporated herein by reference in their entireties.

TECHNICAL FIELD

The present disclosure relates to communications, for example, to a data transmission method and device, and a base station.

BACKGROUND

Since in the mobile communication network, the terminal data traffic has increased significantly, the construction of the 5th generation (5G) mobile communication network needs to reach targets of ultra-high speed, large throughput, ultra-high reliability and ultra-low latency. These targets bring enormous pressures and challenges to the service capability and deployment strategy of the mobile network. Operators, on the one hand need to enhance network deployment and communication technologies, and on the other hand hope to accelerate new technology promotion and network development, so as to implement the goal of rapid improvement of network performance.

The network architecture of the 4th generation (4G) mobile communication has a flat organization structure, in which the radio network control (RNC) is removed and an evolved base station (eNodeB) is directly connected to a core network, thereby reducing the delay. The eNodeB in the 4G network includes a centralized base band unit (BBU) and a radio remote unit (RRU). The BBU has a complete controller plane function (CPF) entity and a complete user plane function (UPF) entity. The UPF entity includes a packet data convergence protocol (PDCP), radio link control (RLC) and medium access control (MAC). A fronthaul interface between the BBU and the RRU uses a common public radio interface (CPRI). Since the CPRI interface is used for transmitting an in-phase quadrature (IQ) signal subject to processing such as physical layer encoding and modulation, the CPRI interface has high requirements for transmission latency and bandwidth. In the 5G network, in order to reduce transmission latency and scheduling latency between different network elements, a higher layer (such as an RLC layer) is required to transmit data to a lower layer (such as a MAC layer) in advance before receiving the scheduling. Due to the introduction of a method of packaging data in advance and transmitting the data, a lower layer under the long term evolution (LTE) architecture cannot distinguish and process the user plane data, causing low transmission efficiency and processing efficiency of the user plane data transmitted by the higher layer.

SUMMARY

A data transmission method and device, and a base station are provided in embodiments of the present disclosure.

A data transmission method includes:

identifying a priority of a received user plane data packet; and transmitting and processing the received user plane data packet according to the identified priority.

In an embodiment, the priority includes a first priority and a second priority, a priority level of the first priority is higher than a priority level of the second priority, a user plane data packet of the first priority includes a retransmitted data packet or a data packet of control type, and a user plane data packet of the second priority includes an initially transmitted data packet or a data packet of data type.

In an embodiment, after identifying a priority of a received user plane data packet, the method further includes at least one of:

if the priority includes the first priority, buffering the user plane data packet of the first priority in a first buffer; or if the priority includes the second priority, buffering the user plane data packet of the second priority in a second buffer.

In an embodiment, the transmitting and processing the received user plane data packet according to the identified priority includes at least one of:

preferentially transmitting the user plane data packet of the first priority; or preferentially cascading the user plane data packet of the first priority.

In an embodiment, the priority of the received user plane data packet is identified through at least one of:

a sequence number identifying an order of the received user plane data packet;

a priority identifier identifying the priority of the received user plane data packet; or a data packet type identifying a type of the received user plane data packet.

A medium access control entity is configured to execute the method described above.

In an embodiment, the medium access control entity is disposed in a distributed unit (DU) of a base station.

A data transmission device includes:

an identification module, which is configured to identify a priority of a received user plane data packet; and a transmission module, which is configured to transmit and process the received user plane data packet according to the identified priority.

In an embodiment, the priority includes a first priority and a second priority, a priority level of the first priority is higher than a priority level of the second priority, a user plane data packet of the first priority includes a retransmitted data packet or a data packet of control type, and a user plane data packet of the second priority includes an initially transmitted data packet or a data packet of data type.

In an embodiment, the device further includes:

a first buffer module, which is configure to, if the priority includes the first priority, buffer the user plane data packet of the first priority; and a second buffer module, which is configured to, if the priority includes the second priority, buffer the user plane data packet of the second priority.

In an embodiment, the transmission module includes:

a transmission unit, which is configured to preferentially transmit the user plane data packet of the first priority; and a cascade unit, which is configured to preferentially cascade the user plane data packet of the first priority.

In an embodiment, the identification module is further configured to identify the priority of the received user plane data packet through at least one of:

a sequence number identifying an order of the received user plane data packet;

a priority identifier identifying the priority of the received user plane data packet; or a data packet type identifying a type of the received user plane data packet.

A medium access control entity includes any data transmission device described above.

A base station includes a centralized unit (CU) and a distributed unit (DU) of a base station, where the DU includes the medium access control entity described above.

A computer-readable storage medium is configured to store computer-executable instructions for executing the method described above.

A UPF entity includes:

at least one processor; and a memory which is in communicative connection with the at least one processor;

the memory stores instructions executable by the at least one processor, which executes the instructions to execute the method described above.

DETAILED DESCRIPTION

The terms "first", "second" and the like in the description, claims and above drawings of the present application are used to distinguish between similar objects and are not necessarily used to describe a particular order or sequence.

Figure 1:
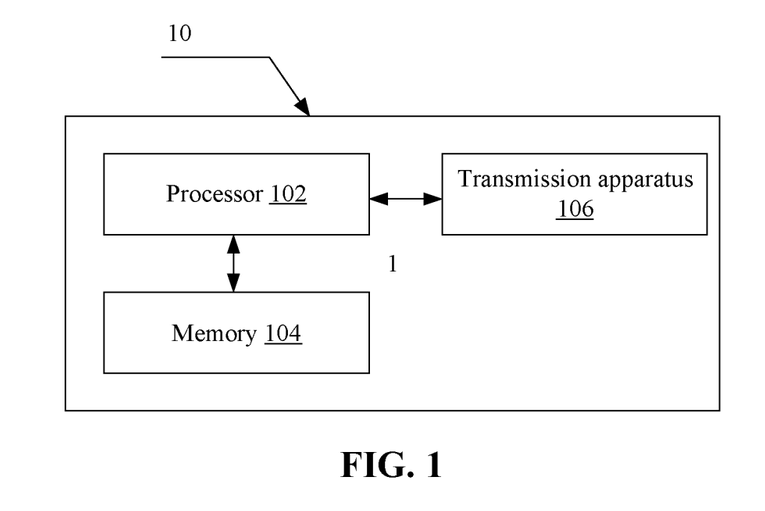
FIG. 1 is a block diagram of a hardware structure of a network element according to an embodiment of the present disclosure.

Methods provided by following one or more embodiments may be executed in a network element, a computer terminal or other similar computing devices. Using running in the network element as an example, FIG. 1 is a block diagram of a hardware structure of a network element according to an embodiment of the present disclosure. As shown in FIG. 1, a network element 10 may include one or more (only one is shown in FIG. 1) processors 102 (the processor 102 may include a microprocessor such as a microcontroller unit (MCU), a programmable logic device such as a field programmable gate array (FPGA), or other processing device), a memory 104 configured to store data, and a transmission apparatus 106 having a communication function. For example, the network element 10 may further include more or less components than the components shown in FIG. 1, or has a configuration different from the configuration shown in FIG. 1.

The processor 102 executes following steps according to program codes stored in the memory: identifying a priority of a received user plane data packet; and transmitting and processing the received user plane data packet according to the identified priority.

In an embodiment, the priority includes a first priority and a second priority, a priority level of the first priority is higher than a priority level of the second priority, a user plane data packet of the first priority includes a retransmitted data packet or a data packet of control type, and a user plane data packet of the second priority includes an initially transmitted data packet or a data packet of data type.

In an embodiment, after identifying the priority of the received user plane data packet, the processor 102 executes at least one of following steps according to program codes stored in the memory:

if the priority includes the first priority, buffering the user plane data packet of the first priority in a first buffer; or if the priority includes the second priority, buffering the user plane data packet of the second priority in a second buffer.

In an embodiment, the processor 102 executes the following according to program codes stored in the memory: the step of transmitting and processing the received user plane data packet according to the identified priority includes at least one of:

preferentially transmitting the user plane data packet of the first priority; or preferentially cascading the user plane data packet of the first priority.

In an embodiment, the priority of the received user plane data packet is identified through at least one of: a sequence number identifying an order of the received user plane data packet, a priority identifier identifying the priority of the received user plane data packet, or a data packet type identifying a type of the received user plane data packet.

The memory 104 may be configured to store software programs and modules of application software, such as program instructions or modules corresponding to the data transmission method in following embodiments. The processor 102 executes the software programs and modules stored in the memory 104 to perform functional applications and data processing, that is, to implement the method described below. The memory 104 may include a high-speed random access memory, and may further include a nonvolatile memory, such as one or more magnetic storage devices, flash memories or other nonvolatile solid-state memories. In some examples, the memory 104 may include memories which are remotely disposed relative to the processor 102 and these remote memories may be connected to the network element 10 via a network. Examples of the preceding network include the Internet, intranets, local area networks, mobile communication networks and combinations thereof. The transmission apparatus 106 is configured to receive or transmit data via a network. The network described above may include a wireless network provided by a communication provider of the mobile terminal 10. In one example, the transmission apparatus 106 includes a network interface controller (NIC), which may be connected to other network devices via a base station and thus be capable of communicating with the Internet. In one example, the transmission apparatus 106 may be a radio frequency (RF) module, which is used for communicating with the Internet in a wireless way.

Figure 2:
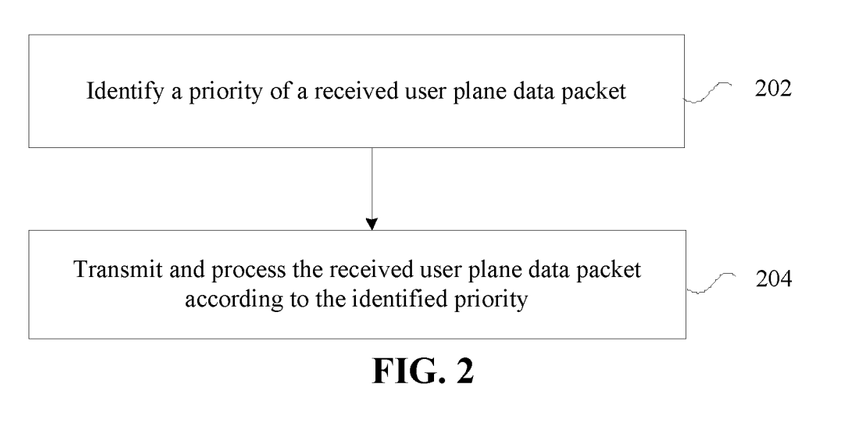
FIG. 2 is a flowchart of a data transmission method according to an embodiment of the present disclosure.

An embodiment of the present disclosure provides a data transmission method executed in the network element. FIG. 2 is a flowchart of a data transmission method according to an embodiment of the present disclosure. As shown in FIG. 2, the method includes the steps described below.

In step 202, a priority of a received user plane data packet is identified.

In step 204, the received user plane data packet is transmitted and processed according to the identified priority.

In an embodiment, the step in which the received user plane data packet is transmitted may be that a higher layer transmits the user plane data packet to a lower layer. The higher layer and the lower layer are relative conception. For example, radio link control (RLC) is the lower layer with respect to a packet data convergence protocol (PDCP), the RLC is the higher layer with respect to medium access control (MAC), and the MAC is the lower layer with respect to the RLC, where "higher" and "lower" refer to locations of protocol layers in a protocol stack.

In an embodiment, the step in which the received user plane data packet is processed includes, for example, that a header is added according to the definition of the protocol stack.

Through identification of a priority of a received user plane data packet as well as transmission and processing of the received user plane data packet according to the identified priority, the user plane data is distinguished through priorities, which improves the transmission efficiency and processing efficiency of the user plane data transmitted by the higher layer.

In an embodiment, the priority described above may include a higher priority and a lower priority. A user plane data packet of the higher priority may include a retransmitted data packet or a data packet of control type, and a user plane data packet of the lower priority may include an initially transmitted data packet or a data packet of data type.

In order to improve the transmission efficiency and processing efficiency of the user plane data packet, after a priority of a received user plane data packet is identified, the method described above may further include at least one of the steps described below.

If the priority includes the higher priority, the user plane data packet of the higher priority is buffered in a first buffer; and if the priority includes the lower priority, the user plane data packet of the lower priority is buffered in a second buffer. Through buffering of the received user plane data and through buffering of respective the user plane data packet of the higher priority and the user plane data packet of the lower priority, the processing efficiency of the user plane data is improved.

In an embodiment, the step in which the received user plane data packet is transmitted and processed according to the identified priority includes at least one of the steps described below.

When the data packets are transmitted, the user plane data packet of the higher priority is transmitted preferentially; and when the data packets are cascaded, the user plane data packet of the higher priority is cascaded preferentially.

In an embodiment, the cascading refers to successive combination of at least two data.

In an embodiment, the priority of the received user plane data packet may be identified in various manners. For example, the priority of the received user plane data packet may be identified through at least one of: a sequence number identifying an order of the received user plane data packet, a priority identifier identifying the priority of the received user plane data packet, or a data packet type identifying a type of the received user plane data packet. The data transmission method described above may be applied to various UPF entities, for example, may be applied to following reconstructed UPF entities. For example, the method described above may be executed by a medium access control entity. In an embodiment, the medium access control entity may be disposed in a distributed unit (DU) of a base station.

In an embodiment, the data transmission method may be applied to data transmission in a DU in the UPF entity. The UPF entity includes a centralized unit (CU) and the DU.

Functions of the CU include: functions of a PDCP entity of a long term evolution (LTE) system and functions of a first part of an RLC entity disposed within the CU. Functions of the DU include: functions of an MAC entity of the LTE system and functions of a second part other than the functions of the first part of the RLC entity of the LTE system.

In another example, functions executed by the CU include: functions corresponding to the PDCP entity of the LTE system and functions corresponding to the RLC entity of the LTE system, and functions executed by the DU include: functions corresponding to the MAC entity of the LTE system.

There are high requirements for transmission latency and bandwidth. When a rate of a 5G air interface is improved to tens of Gbps (Gigabit per second), the requirement for traffic of a common public radio interface (CPRI) will reach a level of Tbps (Terabit per second), which increases network deployment costs and difficulties. Therefore, in the 5G, functions of a centralized base band unit (BBU) and a radio remote unit (RRU) are required to be re-defined, For example, a part of the function of a user plane of a data link layer L2 may be implemented in the BBU, and the other part may be implemented in the RRU. In this embodiment, the BBU and the RRU with re-defined functions are respectively named as CU and DU.

In order to reduce the transmission and package latency, part of the function of the L2 is moved down to the DU. Before scheduling of the DU is received, a data packet in the CU is pre-processed, transmitted to the DU in advance, and buffered in the DU. The data packet transmitted by the CU to the DU is an initially transmitted data packet or a retransmitted data packet, a scheduling priority of the retransmitted data packet is higher than a scheduling priority of the initially transmitted data packet, and the retransmitted data packet and the initially transmitted data packet have different transmission priorities and package priorities. Therefore, the DU is required to have a function of identifying retransmission and the initial transmission, so as to guarantee the preferential package and transmission of the retransmitted data packet.

On the basis of the analysis described above, an embodiment of the present disclosure provides a data transmission method. Using high-priority data being the retransmitted data packet as an example, the retransmitted data packet in the user plane data of a high-layer entity is identified, and the retransmitted data packet is preferentially packaged and transmitted.

Figure 3:
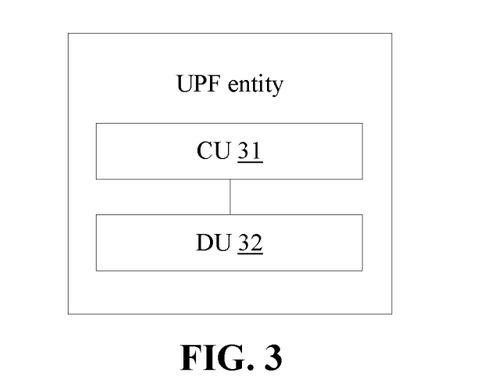
FIG. 3 is a structure diagram of a UPF entity according to an embodiment of the present disclosure.

The data transmission method includes that a second network element (such as the DU described above) receives a data packet of a first network element (such as the CU described above), and performs at least one of initial transmission identification or retransmission identification on the received data packet. Through the data transmission method, after user plane function is reconstructed, the second network element perform at least one of the initial transmission identification or the retransmission identification on the data packet received from the first network element, thereby guaranteeing that the retransmitted data packet is preferentially packaged and transmitted. In this method, the buffer or queue of the retransmission is as short as possible, so as to facilitate the retransmission. An embodiment of the present disclosure provides a reconstructed structure of a UPF entity. FIG. 3 is a structure diagram of a UPF entity according to an embodiment of the present disclosure. As shown in FIG. 3, the user plane includes a CU 31 and a DU 32.

In an embodiment, functions of the CU include: functions of a PDCP entity of an LTE system and functions of a first part of an RLC entity of the LTE system. The first part is disposed within the CU. Functions of the DU include: functions of an MAC entity of the LTE system and functions of a second part other than functions of the first part of the RLC entity of the LTE system. The second part is disposed within the DU.

In an alternative embodiment, functions of the CU include: functions of the PDCP entity of the LTE system and functions of the RLC entity of the LTE system; and functions executed by the DU include: functions of the MAC entity of the LTE system.

The DU is configured to identify whether the user plane data packet received from the CU is the initially transmitted data packet or the retransmitted data packet, and transmit the received user plane data packet using a manner of preferentially transmitting the retransmitted data packet.

In an embodiment, the CU described above is further configured to carry at least one of the followings in the user plane data packet transmitted to the DU:

a sequence number identifying an order of the transmitted user plane data packet; or a priority identifier identifying a priority of the transmitted user plane data packet.

The sequence number or the priority identifier is used for the DU to identify the priority of the received user plane data packet (for example, whether the received user plane data packet is the initially transmitted data packet or the retransmitted data packet is determined according to the priority identifier, and whether the received user plane data packet is a data packet of data type or a data packet of control type is determined according to a data packet type). For example, whether the data packet is the data packet of data type or the data packet of control type is determined through a control bit in the data.

Figure 4:
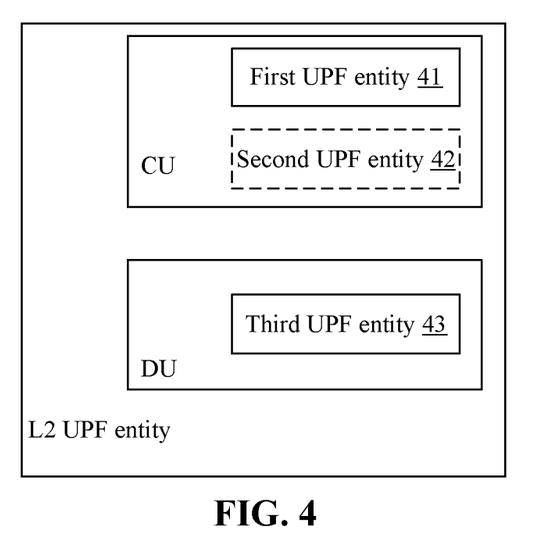
FIG. 4 is a structure diagram of a UPF entity according to another embodiment of the present disclosure.

On the basis of the division of functions between the CU and the DU, the UPF entity is divided into three UPF entities to explain the functions of the UPF entity. FIG. 4 is a structure diagram of a UPF entity according to another embodiment of the present disclosure. As shown in FIG. 4, the UPF entity includes a first UPF entity 41, a second UPF entity 42 and a third UPF entity 43. The first UPF entity may have functions of the PDCP entity in the LTE system, the second UPF entity corresponds to functions of the RLC entity in the LTE system, and the third UPF entity corresponds to functions of the MAC entity in the LTE system. After the functions of the UPF entity are divided, a part of functions of the second UPF entity are deployed in the first UPF entity, and the other part of functions of the second UPF entity are deployed in the third UPF entity. Therefore, the second UPF entity is represented by a dashed box in FIG. 4. The third UPF entity has at least one of a function of identifying the initially transmitted data packet or a function of identifying the retransmitted data packet. In FIG. 4, the first UPF entity and the second UPF entity are disposed in the CU, the third UPF entity is disposed in the DU, and the CU and the DU may be connected through a fronthaul interface.

In an embodiment, after the user plane function (UPF) in the 5G communication system is reconstructed, the second UPF entity transmits the data packet (the initially transmitted data packet or the retransmitted data packet) to the third UPF entity in advance. Since the priority of the retransmitted data packet is higher than the priority of the initially transmitted data packet, the third UPF entity may choose between the retransmission and the initial transmission, so as to preferentially process the retransmitted data packet. On the basis of the reconstructed architecture of the UPF entity, the data transmission method in an embodiment includes: receiving, by a second network element (such as the DU described above), a data packet of a first network element (such as the CU described above), and performing, by the second network element, at least one of initial transmission identification or retransmission identification on the received data packet. The second network element includes the third UPF entity.

The functions of the third UPF entity described above include at least one of the function of identifying the initially transmitted data packet or the function of identifying the retransmitted data packet. The third UPF entity identifies the data packet transmitted by the first network element and identifies whether the received data packet is the retransmitted data packet or the initially transmitted data packet. In an embodiment, the third UPF entity described above maintains two buffers. The method for the third UPF entity to identify at least one of the initially transmitted data packet and the retransmitted data packet may include:

the third UPF entity determines whether the received data packet is the initially transmitted data packet or the retransmitted data packet according to a sequence number (SN) of a currently received data packet and an SN in the data packet received in the buffers.

The first UPF entity and the second UPF entity may also add a priority indication into the data packet transmitted to the third UPF entity. The third UPF entity identifies whether the received data packet is the retransmitted data packet or the initially transmitted data packet according to priority indication information.

The third UPF entity may have a buffer function. The third UPF entity places the identified retransmitted data packet into a retransmission buffer, and places the identified initially transmitted data packet into an initial transmission buffer. The retransmission buffer is also referred to as a retransmission queue. The initial transmission buffer is also referred to as an initial transmission queue.

The third UPF entity may further have a function of cascading the received data packet. The third UPF entity may preferentially assemble and transmit the data packet in the retransmission buffer.

The data packet described above may be a pre-generated data packet. The data packet may be transmitted before receiving scheduling of the third UPF entity of the second network element. Before at least one of the first UPF entity and the second UPF entity receives the scheduling of the third UPF entity, the data packet is generated and transmitted to the third UPF entity.

Figure 5:
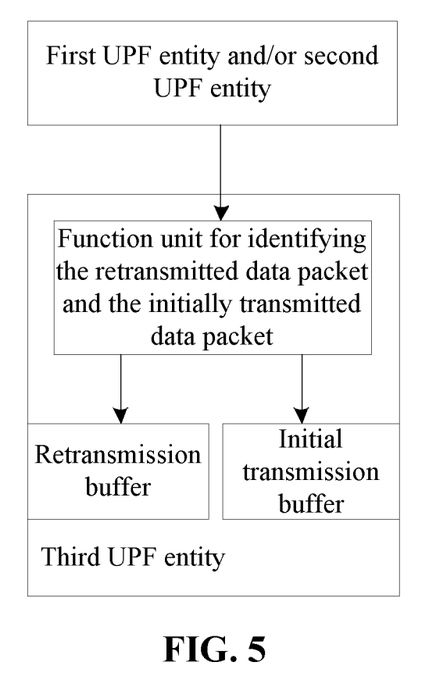
FIG. 5 is a structure diagram of a third UPF entity according to an embodiment of the present disclosure.

FIG. 5 is a structure diagram of a third UPF entity according to an embodiment of the present disclosure. As shown in FIG. 5, after the functions of the UPF entity are divided, at least one of the first UPF entity or the second UPF entity assembles the data packet in advance and transmits the data packet to the third UPF entity. The third UPF entity buffers the data packet. After obtaining transmission time, the third UPF entity assembles the buffered data packet and the transmission time into a first data packet corresponding to the third UPF entity, and transmits the first data packet to the lower layer.

A part of functions of the second UPF entity may be deployed in the first UPF entity, and the other part of functions of the second UPF entity may be deployed in the third UPF entity. In an alternative embodiment, the functions of the second UPF entity are independent. That is, the functions of the second UPF entity are deployed in one entity, and the second UPF entity has functions of the RLC entity in the LTE system.

At least one of the first UPF entity or the second UPF entity transmits the data packet to the third UPF entity in advance.

The data packet is the retransmitted data packet or the initially transmitted data packet.

The third UPF entity includes a function unit having at least one of a function of identifying the initially transmitted data packet and a function of identifying the retransmitted data packet. The third UPF entity corresponds to the MAC entity of the LTE.

In an embodiment, according to an identification result after identifying the initially transmitted data packet or the retransmitted data packet, the third UPF entity places the retransmitted data packet into the retransmission buffer, and places the initially transmitted data packet into the initial transmission buffer. In an embodiment, the third UPF entity maintains two buffers, and the third UPF entity identifies at least one of the initially transmitted data packet or the retransmitted data packet in the following manner:

the third UPF entity maintains two buffers, in which a first buffer is configured to store the initially transmitted data packet, and a second buffer is configured to store the retransmitted data packet;

the third UPF entity determines whether the data packet is the initially transmitted data packet or the retransmitted data packet according to a current SN and an SN in the data packet in the buffers; and if the data packet is the initially transmitted data packet, the initially transmitted data packet is placed in the initial transmission buffer; if the data packet is the retransmitted data packet, the retransmitted data packet is placed in the retransmission buffer.

In an embodiment, the third UPF entity maintains two buffers, and the third UPF entity identifies at least one of the initially transmitted data packet or the retransmitted data packet in the following manner:

the third UPF entity maintains two buffers, in which a first buffer is configured to store the initially transmitted data packet, and a second buffer is configured to store the retransmitted data packet; and the third UPF entity determines whether the data packet is the retransmitted data packet or the initially transmitted data packet according to a priority indication, places the selected initially transmitted data packet into the initial transmission buffer, and places the selected retransmitted data packet into the retransmission buffer; where the priority indication is added by the first UPF entity or the second UPF entity into the data packet transmitted to the third UPF entity.

The third UPF entity may preferentially assemble and transmit the data packet in the retransmission buffer.

In an embodiment, the third UPF entity maintains two buffers, and the third UPF entity identifies at least one of the initially transmitted data packet and the retransmitted data packet, which includes:

the third UPF entity maintains two buffers, in which a first buffer is configured to store the data packet of control type, and a second buffer is configured to store the data packet of data type; and the third UPF entity determines a transmission priority of the data packet according to indication information of data packet type, places the selected data packet of control type into a buffer of control type, and places the selected data packet of data type into a buffer of data type; where the indication information of data packet is added by the first UPF entity or the second UPF entity into the data packet transmitted to the third UPF entity.

The third UPF entity may preferentially assemble and transmit the data packet in the buffer of control type.

Figure 6:
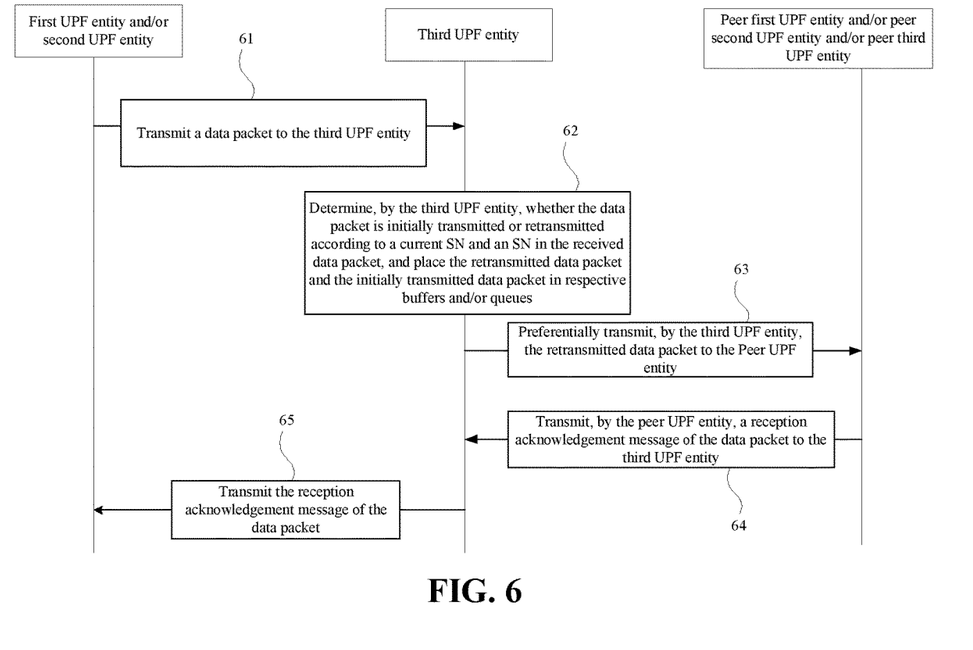
FIG. 6 is a flowchart of a method for retransmitting or initially transmitting a data packet according to a sequence number (SN) according to an embodiment of the present disclosure.

FIG. 6 is a flowchart of a method for retransmitting or initially transmitting a data packet according to a sequence number according to an embodiment of the present disclosure. As shown in FIG. 6, at least one of the first UPF entity or the second UPF entity does not add a priority indication of the data packet in the data packet; instead, the third UPF entity determines whether the data packet is the initially transmitted data packet or the retransmitted data packet according to at least one of an SN of the received data packet of the first UPF entity or an SN of the data packet of the second UPF entity, and the third UPF entity may preferentially package the retransmitted data packet, and transmits the packaged data packet to a peer UPF entity. The FIG. 6 includes steps described below.

In step 61, at least one of the data packet of the first UPF entity and the data packet of the second UPF entity is transmitted to the third UPF entity.

The first UPF entity corresponds to the PDCD entity in the LTE.

The second UPF entity corresponds to the RLC entity in the LTE.

The third UPF entity corresponds to the MAC entity in the LTE.

In an embodiment, the functions of the second UPF entity are deployed in one entity. In an alternative embodiment, a part of the functions of the second UPF entity are deployed in the first UPF entity and the other part of the functions of the second UPF entity are deployed in the third UPF entity.

In an embodiment, the third UPF entity has at least one of a function of identifying the initially transmitted data packet or a function of identifying the retransmitted data packet.

In step 62, the third UPF entity determines whether the data packet is the initially transmitted data packet or the retransmitted data packet according to a current SN and an SN in the received data packet, and places the retransmitted data packet and the initially transmitted data packet in respective buffers.

Assuming that the data packet received by the third data packet entity is a valid data packet, the method for determining the retransmitted data packet and the initially transmitted data packet includes:

if the SN in the data packet received by the third user packet entity is less than the current SN, the third UPF entity determines that the received data packet is the retransmitted data packet, and places the data packet into the retransmission buffer; or if the SN in the data packet received by the third user packet entity is greater than the current SN, the third UPF entity determines that the received data packet is the initially transmitted data packet, and places the data packet into the initially transmission buffer.

In step 63, the third UPF entity preferentially transmits the retransmitted data packet to the peer UPF entity.

For example, an RLC at a network side is a first entity, and an RLC at a terminal side is a peer first entity.

The third UPF entity preferentially packages and transmits the data in the retransmission buffer.

In step 64, the peer UPF entity transmits a reception acknowledgement message of the data packet to the third UPF entity.

The reception acknowledgement message indicates a transmission state of the data packet of at least one of the first UPF entity or the second UPF entity, so as to determine whether next transmission is retransmission of the old data packet or initial transmission of a new data packet.

The reception acknowledgement message is generated by at least one of a peer first UPF entity or a peer second UPF entity.

In step 65, the third UPF entity reports the reception acknowledgement message of the data packet to at least one of the first UPF entity or the second UPF entity.

The third UPF entity transmits a state feedback, which has been fed back from the peer UPF entity in step 64, to at least one of the first UPF entity or the second UPF entity.

At least one of the first UPF entity or the second UPF entity determines to retransmit the old data packet or to initially transmit a new data packet according to the state feedback.

Figure 7:
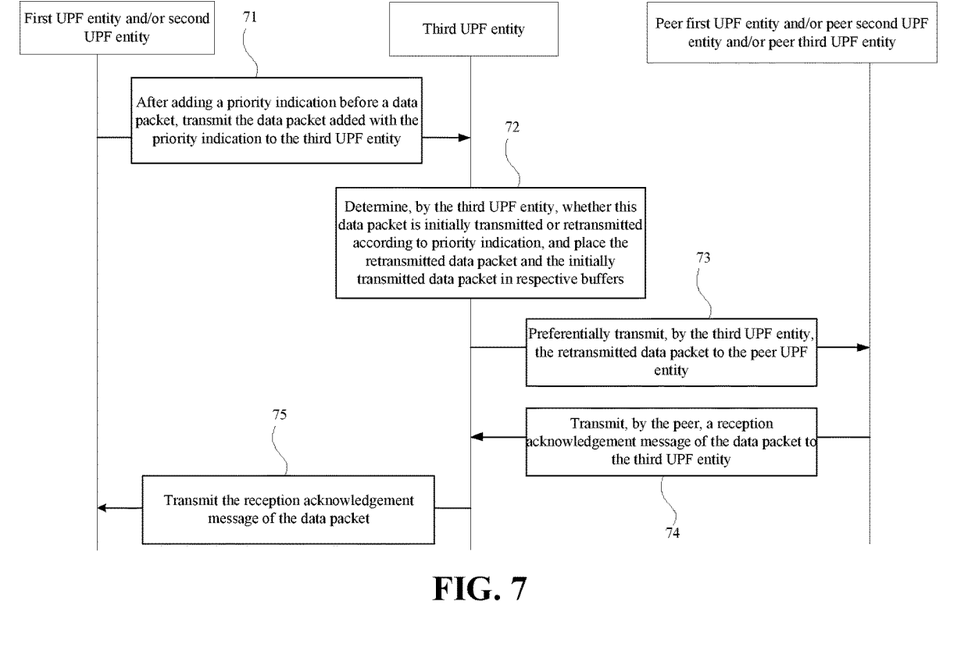
FIG. 7 is a flowchart of a method for retransmitting or initially transmitting a data packet according to a priority indication according to an embodiment of the present disclosure.

FIG. 7 is a flowchart of a method for retransmitting or initially transmitting a data packet according to a priority indication according to an embodiment of the present disclosure. FIG. 7 differs from FIG. 6 in that the third UPF entity determines whether the data packet is the initially transmitted data packet or the retransmitted data packet according to a priority indication carried in the received data packet of at least one of the first UPF entity or the second UPF entity, preferentially packages the retransmitted data packet, and transmits the data packet to a Peer UPF entity.

In step 71, at least one of the first UPF entity or the second UPF entity adds the priority indication before the data packet, and then transmits the data packet with the added priority indication to the third UPF entity.

The first UPF entity corresponds to the PDCD entity in the LTE.

The second UPF entity corresponds to the RLC entity in the LTE.

The third UPF entity corresponds to the MAC entity in the LTE.

In an embodiment, all functions of the second UPF entity are deployed in one entity. In an alternative embodiment, a part of the functions of the second UPF entity are deployed in the first UPF entity and the other part of the functions of the second UPF entity are deployed in the third UPF entity.

The third UPF entity has at least one of a function of identifying the initially transmitted data packet or a function of identifying the retransmitted data packet.

In step 72, the third UPF entity determines whether the data packet is the initially transmitted data packet or the retransmitted data packet according to the priority indication, and places the retransmitted data packet and the initially transmitted data packet in respective buffers.

The priority indication is added by at least one of the first UPF entity or the second UPF entity into the data packet. After the data packet is added with the priority indication, the data packet is transmitted to the third UPF entity.

The third UPF entity distinguishes at least one of the initially transmitted data packet or the retransmitted data packet according to the priority indication in the received data packet.

The priority of the retransmitted data packet is higher than the priority of the initially transmitted data packet.

In step 73, the third UPF entity preferentially transmits the retransmitted data packet to the peer UPF entity.

The third UPF entity preferentially packages and transmits the data in the retransmission buffer.

In step 74, the peer transmits a reception acknowledgement message of the data packet to the third UPF entity.

The reception acknowledgement message indicates a transmission state of the data packet of at least one of the first UPF entity or the second UPF entity, so as to determine whether next transmission is retransmission of the old data packet or initial transmission of a new data packet.

The reception acknowledgement message is generated by at least one of a peer first UPF entity or a peer second UPF entity.

In step 75, the third UPF entity reports the reception acknowledgement message of the data packet to at least one of the first UPF entity or the second UPF entity.

The third UPF entity transmits a state feedback, which has been fed back from the peer in step 74, to at least one of the first UPF entity or the second UPF entity.

At least one of the first UPF entity or the second UPF entity determines whether to retransmit the old data packet or initially transmit a new data packet according to the state feedback.

Figure 8:
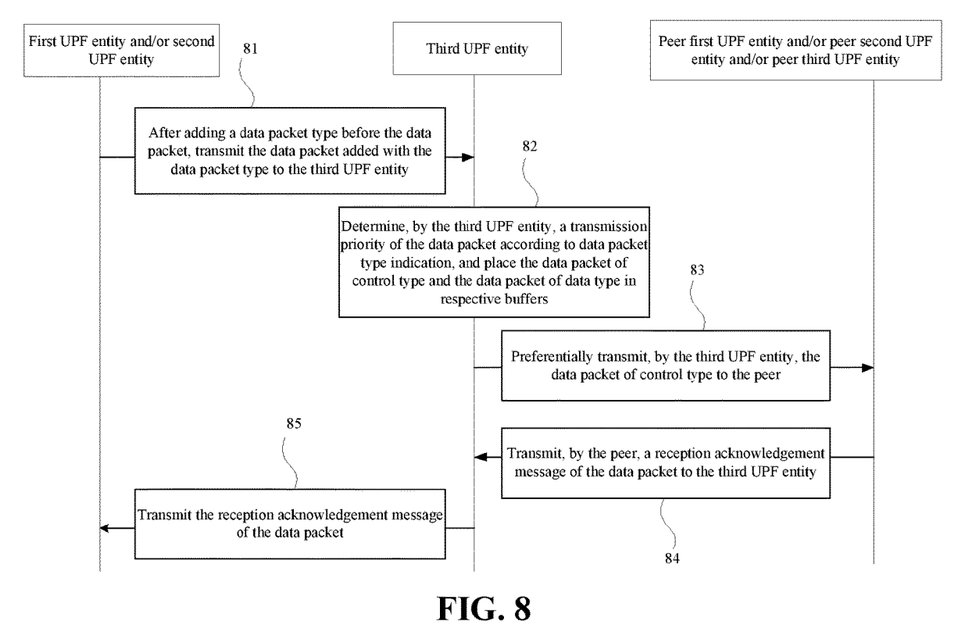
FIG. 8 is a flowchart of a method for preferentially transmitting a data packet according to a data packet type indication according to an embodiment of the present disclosure.

FIG. 8 is a flowchart of a method for preferentially transmitting a data packet according to a data packet type indication according to an embodiment of the present disclosure. As shown in FIG. 8, the embodiment 3 differs from FIG. 6 in that the third UPF entity determines a transmission priority of the data packet according to data packet type indication carried in the received data packet of at least one of the first UPF entity or the second UPF entity, preferentially packages the data packet of control type and transmits the data packet to a peer. Specific steps are described below.

In step 81, at least one of the first UPF entity or the second UPF entity adds a data packet type indication before the data packet, and transmits the data packet with the data packet type indication to the third UPF entity.

The first UPF entity corresponds to the PDCD entity in the LTE.

The second UPF entity corresponds to the RLC entity in the LTE.

The third UPF entity corresponds to the MAC entity in the LTE.

All functions of the second UPF entity are deployed in one entity. In an alternative embodiment, a part of the functions of the second UPF entity are deployed in the first UPF entity and the other part of the functions of the second UPF entity are deployed in the third UPF entity.

The third UPF entity has a function of identifying data packet priority transmission.

In step 82, the third UPF entity determines a transmission priority of the data packet according to the data packet type indication, and places the data packet of control type and the data packet of data type in respective buffers.

At least one of the first UPF entity or the second UPF entity, after adding the data packet type indication before the data packet, transmits the data packet type indication to the third UPF entity.

The third UPF entity distinguishes between the data packet of control type and the data packet of data type according to the data packet indication information in the received data packet.

The data packet of control type has a higher transmission and processing priority.

In step 83, the third UPF entity preferentially transmits the data packet of control type to a peer UPF entity.

The third UPF entity preferentially packages and transmits the data in the buffer of control type.

In step 84, the peer UPF entity transmits a reception acknowledgement message of the data packet to the third UPF entity.

The reception acknowledgement message indicates a transmission state of the data packet of at least one of the first UPF entity or the second UPF entity, so as to determine whether to retransmit the old data packet or initially transmit a new data packet next time.

The reception acknowledgement message is generated by at least one of a peer first UPF entity or a peer second UPF entity.

In step 85, the third UPF entity reports the reception acknowledgement message of the data packet to at least one of the first UPF entity or the second UPF entity.

The third UPF entity transmits a state feedback, which has been fed back from the peer in step 84, to at least one of the first UPF entity or the second UPF entity.

At least one of the first UPF entity or the second UPF entity determines whether to retransmit or initially transmit the data packet according to the state feedback.

The method in embodiments described above may be implemented by software plus a general-purpose hardware platform, or may be implemented by hardware. The present disclosure may be embodied in the form of a software product. The computer software product is stored in a non-transient storage medium (such as a read-only memory (ROM), a random-access memory (RAM), a magnetic disk or an optical disk) and the storage medium includes one or more instructions for enabling a terminal device (which may be a mobile phone, a computer, a server, or a network device) to execute the method described in the embodiments of the present disclosure.

The embodiments of the present disclosure further provide a data transmission device for implementing any method described in the embodiment 1. As used below, the term "module" may be software, hardware or a combination thereof capable of implementing predetermined functions. The apparatus described below in the embodiment may be implemented by software, hardware or a combination of software and hardware.

Figure 9:
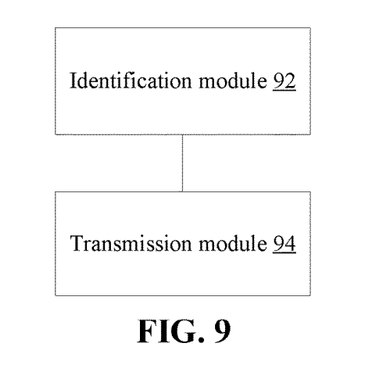
FIG. 9 is a block diagram of a data transmission device according to an embodiment of the present disclosure.

FIG. 9 is a block diagram of a data transmission device according to an embodiment of the present disclosure. As shown in FIG. 9, the device includes an identification module 92 and a transmission module 94.

The identification module 92 is configured to identify a priority of a received user plane data packet. The transmission module 94 is connected to the identification module 92 and is configured to transmit and process the received user plane data packet according to the identified priority.

In an embodiment, the priority described above includes a higher priority and a lower priority. A user plane data packet of the higher priority includes a retransmitted data packet or a data packet of control type, and a user plane data packet of the lower priority includes an initially transmitted data packet or a data packet of data type.

Figure 10:
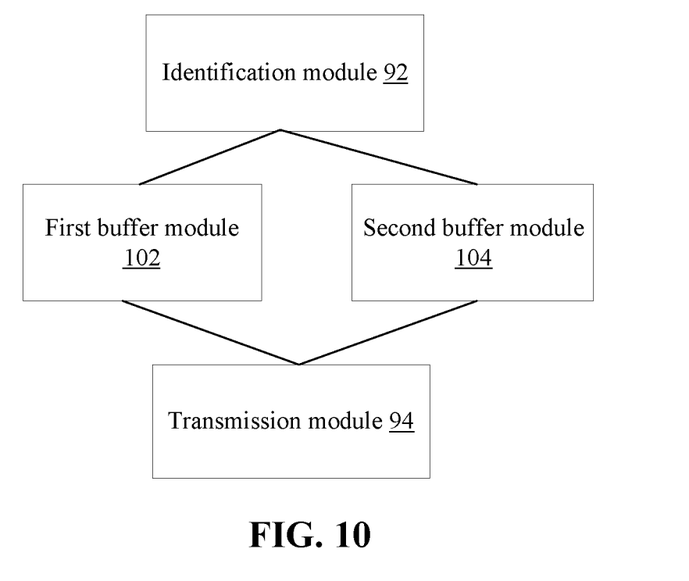
FIG. 10 is a block diagram of a data transmission device according to another embodiment of the present disclosure.

FIG. 10 is a block diagram of a data transmission device according to another embodiment of the present disclosure. As shown in FIG. 10, the device further includes a first buffer module 102 and a second buffer module 104 in addition to all of the modules shown in FIG. 9.

The first buffer module 102 is connected to the identification module 92 and the transmission module 94 and is configure to buffer the user plane data packet of the higher priority in a first buffer. The second buffer module 104 is connected to the identification module 92 and the transmission module 94 and is configure to buffer the user plane data packet of the lower priority in a second buffer.

The first buffer is also referred to as a first queue, and the second buffer is also referred to as a second queue.

Figure 11:
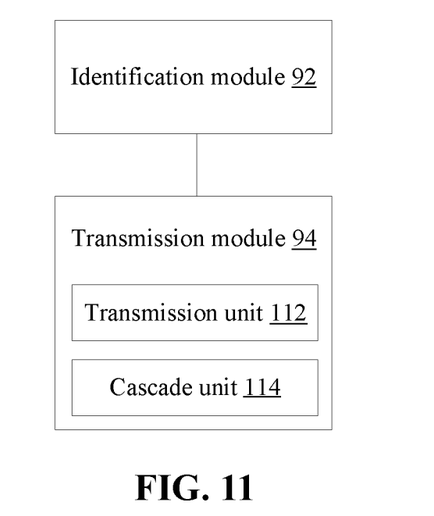
FIG. 11 is a block diagram of a transmission module in the data transmission device according to an embodiment of the present disclosure.

FIG. 11 is a block diagram of a transmission module in the data transmission device according to an embodiment of the present disclosure. As shown in FIG. 11, the transmission module 94 includes a transmission unit 112 and a cascade unit 114.

The transmission unit 112 is configured to preferentially transmit the user plane data packet of the higher priority. The cascade unit 114 is configured to preferentially cascade the user plane data packet of the higher priority.

In an embodiment, the identification module 92 is configured to identify the priority of the received user plane data packet through at least one of: a sequence number identifying an order of the received user plane data packet, a priority identifier identifying the priority of the received user plane data packet, or a data packet type identifying a type of the received user plane data packet.

Figure 12:
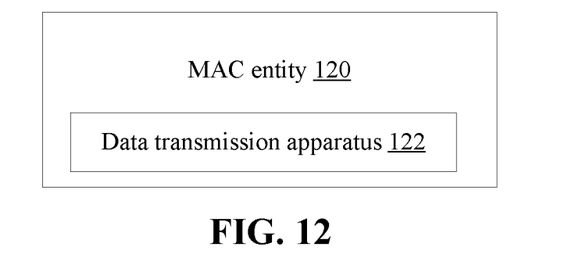
FIG. 12 is a schematic diagram of a medium access control entity according to an embodiment of the present disclosure.

FIG. 12 is a schematic diagram of a medium access control entity according to an embodiment of the present disclosure. As shown in FIG. 12, the medium access control entity 120 includes the data transmission device 122 described above.

Figure 13:
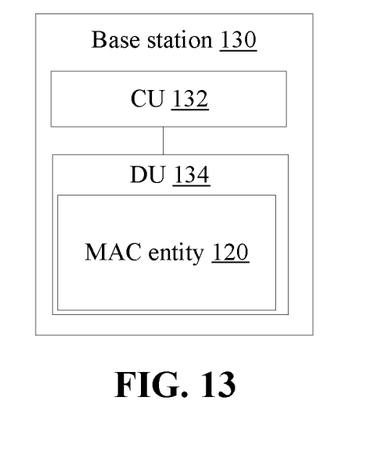
FIG. 13 is a block diagram of a base station according to an embodiment of the present disclosure.

FIG. 13 is a block diagram of a base station according to an embodiment of the present disclosure. As shown in FIG. 13, the base station 130 includes a CU 132 and a DU 134. The DU 134 includes the medium access control entity 120 described above.

In an embodiment, a UPF entity of the base station includes the CU and the DU. Functions of the CU include: functions of a PDCP entity of an LTE system and functions of a first part of an RLC entity of the LTE system; and functions of the DU include: functions of an MAC entity of the LTE system and functions of a second part other than functions of the first part of the RLC entity of the LTE system. In an alternative embodiment, functions of the CU include: functions of the PDCP entity of the LTE system and functions of the RLC entity of the LTE system; and functions of the DU include: functions of the MAC entity of the LTE system.

One or more modules described above may be implemented by software or hardware. In the implementation by hardware, the modules described above are disposed in the same processor or respectively in processors in any combination.

The present disclosure provides a storage medium. In an embodiment, the storage medium may be configured to store program codes for executing following steps:

identifying a priority of a received user plane data packet; and transmitting and processing the received user plane data packet according to the identified priority.

In an embodiment, the priority described above includes a higher priority and a lower priority. A user plane data packet of the higher priority includes a retransmitted data packet or a data packet of control type, and a user plane data packet of the lower priority includes an initially transmitted data packet or a data packet of data type.

In an embodiment, after identifying a priority of a received user plane data packet, the storage medium is further configured to store program codes for executing at least one of following steps:

if the priority includes the higher priority, buffering the user plane data packet of the higher priority in a first buffer; and if the priority includes the lower priority, buffering the user plane data packet of the lower priority in a second buffer.

In an embodiment, the storage medium is further configured to store program codes for executing the step described below.

The step of transmitting and processing the received user plane data packet according to the identified priority includes at least one of:

preferentially transmitting the user plane data packet of the higher priority; or preferentially cascading the user plane data packet of the higher priority.

In an embodiment, the storage medium is further configured to store program codes for executing the step described below.

The priority of the received user plane data packet is identified through at least one of: a sequence number identifying an order of the received user plane data packet, a priority identifier identifying the priority of the received user plane data packet, or a data packet type identifying a type of the received user plane data packet.

In an embodiment, the data transmission method described above is executed by a medium access control entity.

In an embodiment, the medium access control entity is disposed in a DU of a base station.

In an embodiment, the storage medium may include a USB disk, a read-only memory (ROM), a random access memory (RAM), a mobile hard disk, a magnetic disk, an optical disk or another medium capable of storing program codes.

The one or more modules or one or more steps in the above-mentioned embodiments may be implemented on a general-purpose computing device. They may be concentrated on a single computing device or distributed over a network composed of multiple computing devices. In an embodiment, the one or more modules or one or more steps may be implemented by program codes executable by the computing devices, so that the one or more modules or one or more steps may be stored in a storage apparatus and executed by the computing devices. In some circumstances, the illustrated or described steps may be executed in sequences different from those described herein, or the one or more modules or one or more steps may be made into various integrated circuit modules separately, or multiple modules or steps therein may be made into a single integrated circuit module for implementation.

INDUSTRIAL APPLICABILITY

A data transmission method and device, and a base station improve the transmission efficiency and processing efficiency of the user plane data transmitted by the higher layer.

What is claimed is:

1. A data transmission method, comprising:
   identifying a priority of a received user plane data packet; and
   transmitting and processing the received user plane data packet according to the identified priority;
   wherein the priority of the received user plane data packet is identified through a sequence number identifying an order of the received user plane data packet;
   wherein the priority comprises a first priority and a second priority, a priority level of the first priority is higher than a priority level of the second priority, a user plane data packet of the first priority comprises a retransmitted data packet, and a user plane data packet of the second priority comprises an initially transmitted data packet; and
   wherein the transmitting and processing the received user plane data packet according to the identified priority comprises: in a case where the received user plane data packet comprises the user plane data packet of the first priority and the user plane data packet of the second priority, cascading the user plane data packet of the first priority, and then cascading the user plane data packet of the second priority.

2. The method of claim 1, wherein after identifying the priority of the received user plane data packet, the method further comprises at least one of;
   in response to determining that the priority comprises the first priority, buffering the user plane data packet of the first priority in a first buffer; or
   in response to determining that the priority comprises the second priority, buffering the user plane data packet of the second priority in a second buffer.

3. The method of claim 1, wherein the priority of the received user plane data packet is identified through the sequence number identifying the order of the received user plane data packet and at least one of:
   a priority identifier identifying the priority of the received user plane data packet; or
   a data packet type identifying a type of the received user plane data packet.

4. A medium access control entity, configured to execute the method of claim 1.

5. The medium access control entity of claim 4, wherein the medium access control entity is disposed in a distributed unit (DU) of a base station.

6. A computer-readable storage medium, configured to store computer-executable instructions for executing the method of claim 1.

7. The method of claim 2, wherein the priority of the received user plane data packet is identified through the sequence number identifying the order of the received user plane data packet and at least one of:
   a priority identifier identifying the priority of the received user plane data packet; or
   a data packet type identifying a type of the received user plane data packet.

8. A data transmission device, comprising:
   a processor; and a memory for storing instructions executable by the processor, wherein the processor is configured to:

identify a priority of a received user plane data packet; and transmit and process the received user plane data packet according to the identified priority;

wherein the priority of the received user plane data packet is identified through a sequence number identifying an order of the received user plane data packet;

wherein the priority comprises a first priority and a second priority, a priority level of the first priority is higher than a priority level of the second priority, a user plane data packet of the first priority comprises a retransmitted data packet, and a user plane data packet of the second priority comprises an initially transmitted data packet; and wherein the processor is configured to: in a case where the received user plane data packet comprises the user plane data packet of the first priority and the user plane data packet of the second priority, cascade the user plane data packet of the first priority, and then cascade the user plane data packet of the second priority.

9. The device of claim 8, wherein the processor is further configured to:

in response to determining that the priority comprises the first priority, buffer the user plane data packet of the first priority; and in response to determining that the priority comprises the second priority, buffer the user pane data packet of the second priority.

10. The device of claim 8, wherein the processor is further configured to identify the priority of the received user plane data packet through the sequence number identifying the order of the received user plane data packet and at least one of:

a priority identifier identifying the priority of the received user plane data packet; or a data packet type identifying a type of the received user plane data packet.

11. A medium access control entity, comprising the data transmission device of claim 8.

12. A base station, comprising a centralized unit (CU) and a distributed unit (DU) of a base station, wherein the DU comprises the medium access control entity of claim 11.

\* \* \* \* \*